United States Patent
Pourcyrous (10) Patent No.: US 10,725,648 B2
(45) Date of Patent: Jul. 28, 2020

(54) CONTEXTUAL PRESSURE-SENSING INPUT DEVICE

(71) Applicant: PayPal, Inc., San Jose, CA (US)

(72) Inventor: Sam Pourcyrous, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 55 days.

(21) Appl. No.: 15/698,270

(22) Filed: Sep. 7, 2017

(65) Prior Publication Data

US 2019/0073108 A1 Mar. 7, 2019

(51) Int. Cl.
*G06F 3/0488* (2013.01)
*G06Q 20/40* (2012.01)
*G06F 3/041* (2006.01)

(52) U.S. Cl.
CPC .......... *G06F 3/0488* (2013.01); *G06F 3/0414* (2013.01); *G06Q 20/40* (2013.01)

(58) Field of Classification Search
CPC ...... G06F 3/0488; G06F 3/0414; G06Q 20/40
See application file for complete search history.

(56) References Cited

U.S. PATENT DOCUMENTS

| | | | |
|---|---|---|---|
| 8,619,051 B2 | 12/2013 | Lacroix et al. | |
| 8,659,571 B2 | 2/2014 | Birnbaum et al. | |
| 9,092,057 B2 | 7/2015 | Varela et al. | |
| 9,459,728 B2 | 10/2016 | Vartanian et al. | |
| 2003/0065942 A1* | 4/2003 | Lineman | G06F 21/577 726/4 |
| 2003/0098887 A1* | 5/2003 | Li | G06F 3/04895 715/809 |
| 2007/0208731 A1* | 9/2007 | Kato | G06Q 10/10 |
| 2009/0248510 A1* | 10/2009 | Ahluwalia | G06F 17/3064 705/14.54 |
| 2011/0314426 A1* | 12/2011 | Jakobsson | G06F 3/0481 715/863 |
| 2014/0055407 A1 | 2/2014 | Lee et al. | |
| 2015/0331553 A1* | 11/2015 | Shaffer | G06F 3/013 715/765 |
| 2017/0193544 A1* | 7/2017 | Glasgow | G06Q 30/0242 |
| 2018/0096319 A1* | 4/2018 | Aggarwal | G06Q 20/10 |
| 2018/0232643 A1* | 8/2018 | Ekambaram | G06F 1/163 |

(Continued)

OTHER PUBLICATIONS

Township Wiki Sport Fishing Event dated Mar. 3, 2017. Accessed Wayback machine date Mar. 7, 2017 10 pages (Year: 2017).*

(Continued)

*Primary Examiner* — Andrea N Long
(74) *Attorney, Agent, or Firm* — Haynes and Boone, LLP (57) ABSTRACT

A method for contextual pressure-sensing input, includes determining context of a document being displayed to a user by a display of a user device. The display includes a pressure-sensing input module for detecting touch inputs. The method includes determining engagement level that indicates an amount of engagement of the user with the document. The method includes determining, based on the engagement level and on the context, a pressure input requirement for the document. The pressure input requirement indicates an amount of pressure needed to verify acknowledgement of the document by the user. The method also includes determining whether a user touch input detected at the display matches the pressure input requirement.

20 Claims, 6 Drawing Sheets

(56) References Cited

U.S. PATENT DOCUMENTS

2018/0275862 A1* 9/2018 Khoe .................. G06F 3/04855
2018/0300751 A1* 10/2018 Hammitt .............. G06K 9/6267

OTHER PUBLICATIONS

Morris, Paul "Apple's 3D Touch Vs Force Touch Vs Multi-Touch [Compared]" [Online] Redmond Pie [retrieved on Aug. 15, 2017]. Retrieved from the Internet: <URL: http://www.redmondpie.com/apples-3d-touch-vs-force-touch-vs-multi-touch-compared/>, Sep. 14, 2015.

Unknown "BlackBerry's SurePress" [Online] Eyerys [retrieved on Aug. 15, 2017]. Retrieved from the Internet: <URL: https://www.eyerys.com/articles/timeline/blackberrys-surepress#event-a-href-articles-timeline-facebook-and-billion-userfacebook-and-a-billion-user-a>, Nov. 14, 2008.

Unknown "Force Touch" [Online] Wikipedia [retrieved on Aug. 15, 2017]. Retrieved from the Internet: <URL: https://en.wikipedia.org/wiki/Force_Touch>.

Unknown "Force Touch, Opening Many New Possibilities for Interactions" [Online] Eyerys [retrieved on Aug. 15, 2017]. Retrieved from the Internet: <URL: https://www.eyerys.com/articles/force-touch-opening-many-new-possibilities-interactions>.

Levi, Joe "Force Touch? Android has had that for years" [Online] Pocketnow [retrieved on Aug. 15, 2017]. Retrieved from the Internet: <URL: http://pocketnow.com/2015/09/07/force-touch-android-has-had-that-for-years>, Sep. 7, 2015.

Tanous, Jim "How to Adjust 3D Touch Sensitivity on the IPhone 6S" [Online] RekRevue [retrieved on Aug. 15, 2017]. Retrieved on the Internet: <URL: https://www.tekrevue.com/tip/3d-touch-sensitivity-iphone-6s/>, Oct. 9, 2015.

Unknown "Pointing device" [Online] Wikipedia [retrieved on Aug. 23, 2017]. Retrieved from the Internet: <URL: https://en.wikipedia.org/wiki/Pointing_device>.

Ye, Shen "The science behind Force Touch and the Taptic Engine" [Online] iMore [retrieved on Aug. 15, 2017]. Retrieved from the Internet: <URL: https://www.imore.com/science-behind-taptics-and-force-touch>, Apr. 8, 2015.

Stroud, Forrest "Force Touch" [Online] Webopedia [retrieved on Aug. 15, 2017]. Retrieved from the Internet: <URL: http://www.webopedia.com/TERM/F/force-touch.html>.

* cited by examiner

CONTEXTUAL PRESSURE-SENSING INPUT DEVICE

BACKGROUND

Embodiments of the inventive subject matter generally relate to the field of input systems and, more particularly, to communication via touch devices such as touchscreens, touchpads, and/or trackpads.

Pressure sensing technology enables input systems, such as touchscreens, touchpads, and trackpads, to receive and measure user input. The pressure sensing technology can distinguish between different level of force being applied to its surface by a user via a pressure input. The pressure sensing technology can also determine a duration of time the pressure is being applied by the pressure input. The input device can provide a haptic feedback to the user indicating that a pressure input is detected by the input system. A computer system that incorporates the pressure sensing input system can incorporate the detection of the pressure input as a touch input.

The touch input can indicate a two-dimensional location of a user's press on the touchscreen, touchpad, or trackpad. Users interact with the device by physically pressing items shown on the screen, either with their fingers or some helping tool. For example, the pressure sensing technology can be implemented using resistive and/or capacitive touchscreens that have conductive materials embedded in the glass and detect the position of the touch by measuring changes in electric current. However, it is difficult to determine the user's engagement with content that is shown via a display device. It is also difficult to coordinate pressure sensing technology with user's engagement with such content.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although some examples refer to touchscreens, other types of touch pressure-sensitive input devices can be used, such as touchpads and trackpads. Furthermore, although some examples refer to two-dimensional display and touch pressure-sensitive input devices, the embodiments described herein can be used with three-dimensional display and input systems.

Pressure sensing technology enables input systems, such as touchscreens, touchpads, and/or trackpads (referred to as a "touch devices"), to receive and measure user input. Users can interact with the touch device by providing a touch input that physically applies pressure to a portion of the touch device, such as by pressing down on an area of the touch device, either with their finger(s) or by using a pointing tool. The touch device can implement the pressure sensing technology using resistive and/or capacitive technology. For example, a touchscreen can use conductive materials embedded in the glass, and can detect a position of the touch by measuring changes in electric current.

The pressure sensing technology can distinguish between different level of force being applied to its surface by a user via a pressure input. The pressure sensing technology can also determine a duration of time the pressure is being applied by the pressure input. The input device can provide a haptic feedback to the user indicating that a user's touch input is detected by the input system. A computer system that incorporates the pressure sensing input system can detect user's touch input. The touch input can indicate a location (e.g., a two-dimensional (2-D) location) on the touch device, which is then correlated to a location of elements displayed on the display.

In some embodiments, the user device can implement a contextual pressure-sensing input for determining the user's engagement with content that is shown via the touchscreen (or another display device). The user device can determine context of a document being displayed to a user by a display of a user device. The display includes a pressure-sensing input module for detecting touch pressure inputs. The user device can determine engagement level that indicates an amount of engagement of the user with the document. The user device can determine, based on the engagement level and on the context, a pressure input requirement for the document. The pressure input requirement indicates an amount of pressure needed to verify acknowledgement of the document by the user. The user device can determine whether a user touch input detected at the display matches the pressure input requirement. Responsive to a determination that the user input matches the pressure input requirement, the user device can indicate that the document is acknowledged by the user.

In some embodiments, the user device can determine importance level of a transaction presented, to a user, via the display of the user device. The user device can determine engagement level that indicates an amount of engagement of the user for the transaction. The user device can determine, based on the engagement level and on the importance level, a pressure input requirement for the transaction, the pressure input requirement indicating an amount of pressure needed to verify authorization of the transaction by the user. The user device can determine whether a user input detected by a pressure sensing input device matches the pressure input requirement. Responsive to a determination that the user input matches the pressure input requirement, the user device can indicate that the transaction is authorized by the user. The following description, and associated Figures, illustrates various embodiments directed to the ideas listed above.

Figure 1:
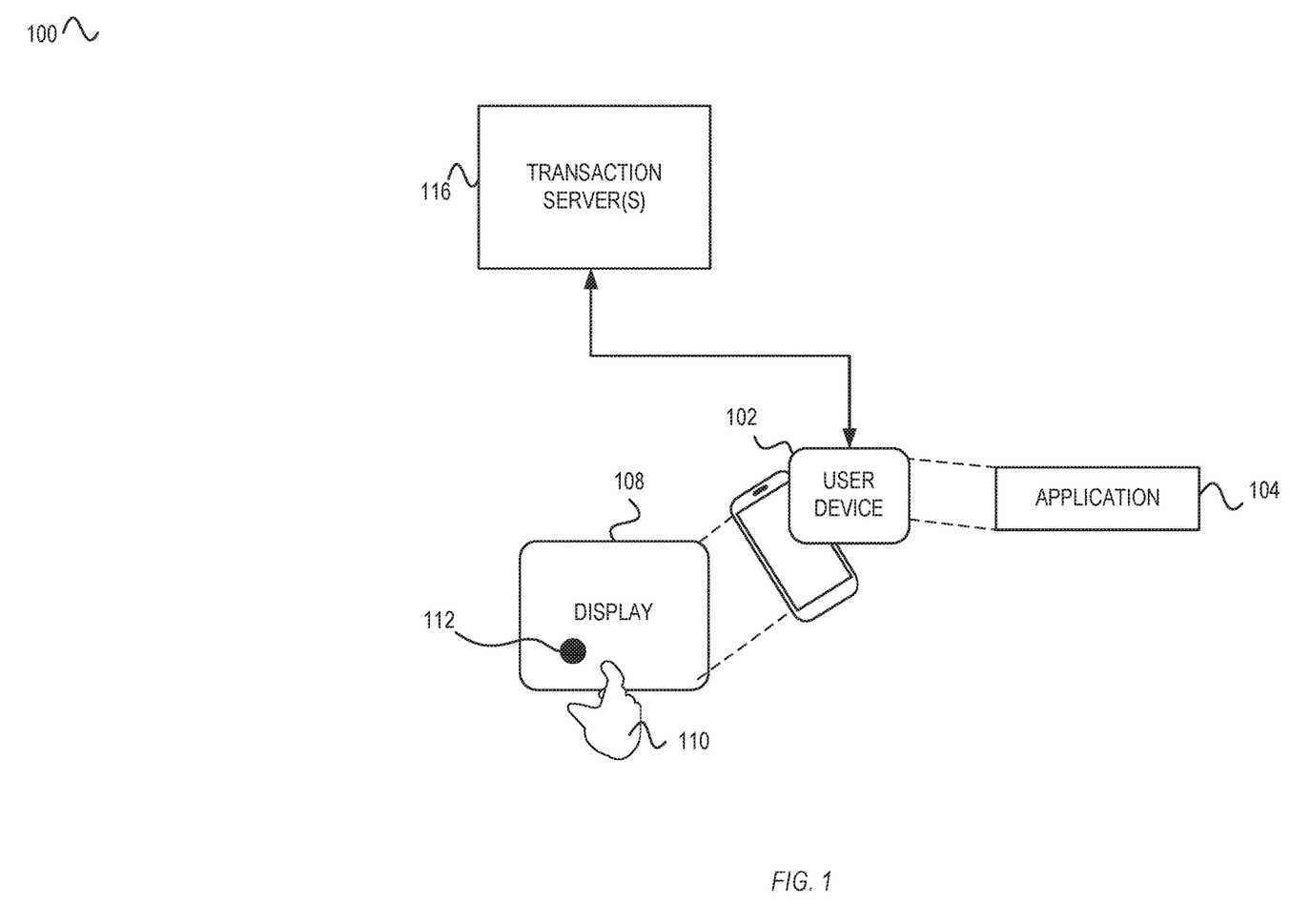
FIG. 1 is a system diagram illustrating embodiments of a user device that implements contextual pressure-sensing input.

FIG. 1 is a system diagram illustrating embodiments of a user device that implements contextual pressure-sensing input. In an overview of the system diagram 100, the user device 102 includes a display 108 that implements pressure sensing technology. The user device also hosts an application 104 that provides elements to the display 108 for displaying. The application 104 can receive user input via the display 108. The application can communicate with the transaction server 116.

The application 104 can be any type of an application that requires an acknowledgement and/or authorization from the user. The application 104 can be a payment application that requires authorization from the user to confirm a payment transaction. For example, the application 104 can require authorization when the payment transaction is greater than a certain threshold. In some embodiments, if the payment transaction is smaller than a threshold, the application 104 may not require the authorization of the payment transaction.

The application 104 can require acknowledgement that the user has accessed a certain document. The document can be an End-User License Agreement (EULA), such that acknowledgement of the EULA is necessary to execute the application 104 on the user device 102. The document can be another type of a document that requires user acknowledgement. The document can be a contract or another type of a document that is accessed by the application 104 and then determined to require user acknowledgement. For example, the user device can determine context of the document, and based on the context, determine whether the document requires user acknowledgement. The context of the document can be based on an importance level of the document, which can be determined based on a sender of the document and/or whether the document type is one that typically requires acknowledgement. The document can include one or more tags that indicate important portions of the document. The application 104 can determine the context of the document by accessing the document at the location of the tag(s).

The application 104 can require user authorization of certain transactions. When processing a transaction, the application 104 can determine an importance level of the transaction based on an amount of the transaction, e.g., whether the transaction for an amount that is greater than a threshold. The threshold can be received from the user, or it can be dynamically calculated based on an amount of funds available at the user's account. The application 104 can determine an importance level of the transaction based on other criteria, such as a type of a transaction or a recipient of the transaction, among others.

The user device can determine user engagement with relation to the document or to the transaction. For the document, the application 104 can determine the user engagement that indicates an amount of engagement of the user with the document. The user engagement can be used to estimate whether the user is paying attention to various portions of the document. For example, the user engagement can be correlated to the context of the document to determine whether the user is paying attention to vital portions of the document. The application 104 can determine whether the user has accessed the document based on how the user accesses the document via the display 108 and/or based on data from one or more sensors of the user device. The application 104 can determine whether the user has accessed the document by determining whether the user has accessed the document at the location of the tag(s).

When processing transactions, the application 104 can determine the user engagement that indicates an amount of engagement of the user with a transaction. For example, the application 104 can determine whether the user has visually accessed a portion of the display 108 (e.g., one or more displayed elements) that displays the cost of the transaction, a portion of the display 108 that displays a funding portion for the transaction, and/or a portion of the display 108 that displays a return policy associated with the transaction, among others. For example, the portion of the display 108 that displays a return policy related to the transaction can be located in a different portion, or may require the user to click on a link. The application 104 can determine a user engagement level for each such portion.

In some embodiments, the application 104 can determine a single user engagement level for the entire document or transaction. In some embodiments, the application 104 can determine the single engagement level that is an average of user engagement levels for each portion of the document or transaction. In some embodiments, instead of an average, the single user engagement level can be determined using a weighted average that assigns different weights to different portions of the document or transaction. The weights can be predetermined, such as assigned at a time of creation of the document. The weights can be based on a determination of the context of the document or an importance level of the transaction.

When processing documents, the application 104 can determine a pressure input requirement based on the engagement level and context of the document. The application 104 can determine a correlation between the engagement level and the context of the document, where determination of the pressure input requirement is based on the correlation. Similarly, when processing transactions, the application 104 can determine the pressure input requirement based on the engagement level and the importance level. The application 104 can determine a correlation between the engagement level and the context of the document. The application 104 determines the pressure input requirement based on the correlation.

The application 104 can cause the display 108 to display an engagement element 112, where the user can provide a touch press (e.g., via a touch input 110). The application 104 can provide a prompt to the user for accessing the engagement element 112. The prompt can be provided via the display 108, via a speaker on the user device 102, and/or via other input/output modules. Upon detecting the user's touch input 110, the application 104 can determine an amount of pressure exerted at the engagement element 112 of the display 108. The application 104 can determine whether the amount of pressure of the user's touch input 110 matches the required pressure of the pressure input requirement. The application 104 can also determine whether the amount of pressure of the user's touch input 110 matches the required pressure for the required duration of time of the pressure input requirement.

Figure 2:
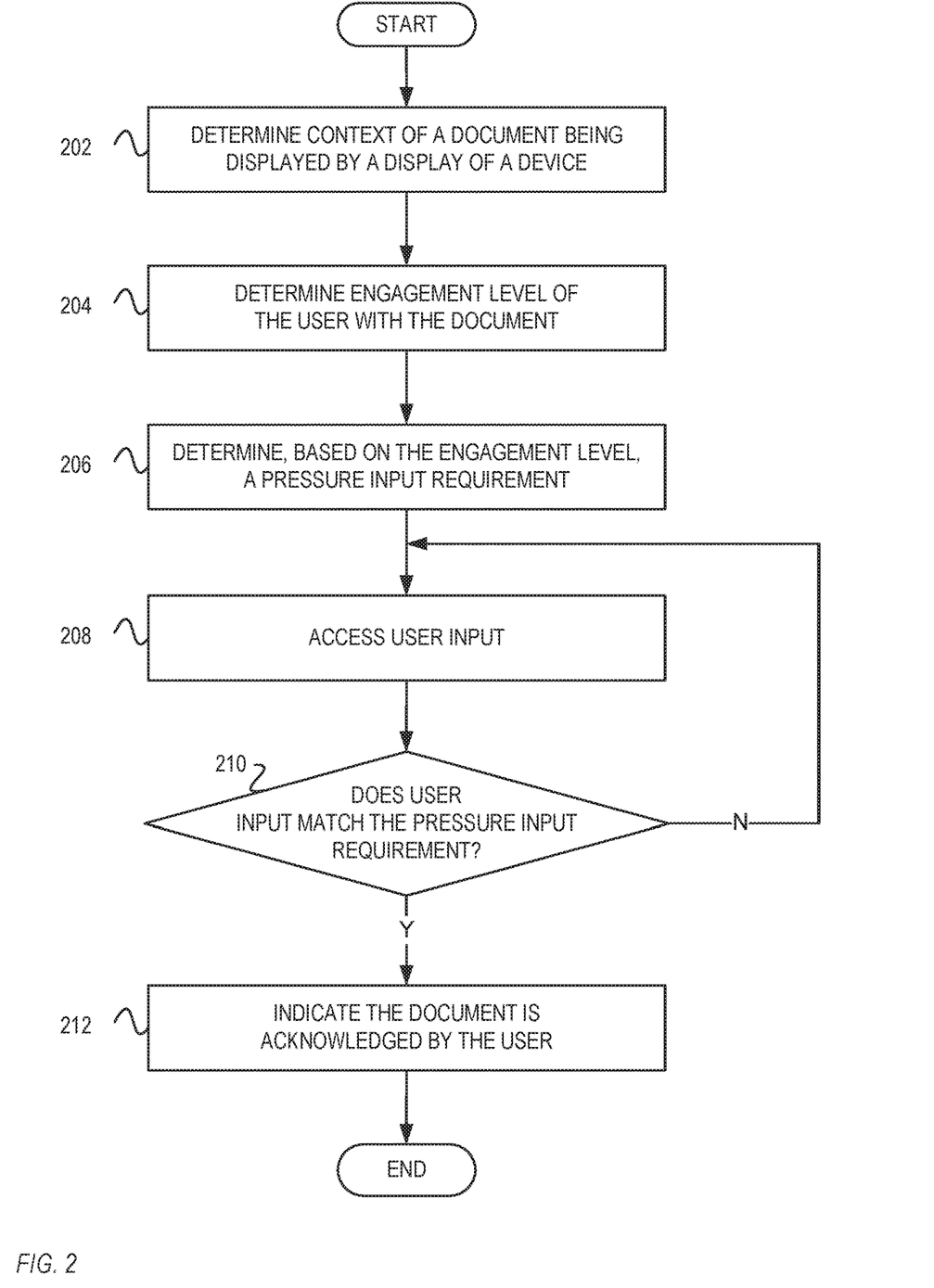
FIG. 2 is a flow diagram illustrating embodiments of operations for using contextual pressure-sensing input.

FIG. 2 is a flow diagram illustrating embodiments of operations for using contextual pressure-sensing input. The method of FIG. 2 is described with reference to the systems and components described in FIG. 1 (for illustration purposes and not as a limitation). The example operations can be carried out by the application 104.

Beginning with 202, the application determines context of a document being displayed to a user by a display of a user device, the display comprising a pressure-sensing input module for detecting touch inputs. With reference to FIG. 1, the application 104 can determine the context of the document being displayed via the display 108. The application 104 can determine an importance level of the document, and determine the context of the document based, at least in part, on the importance level. The application 104 can also determine a location of one or more tags in the document.

The application 104 can determine the context of the document based on the type and/or location of the tags in the document.

In some embodiments, the context of the document is determined based on a binary results of an importance determination, i.e., the document either is important enough for using contextual pressure-sensing input or it is not. If the document is not important enough (e.g., based on a threshold determination or whether the document is an EULA or a contract), then the pressure input requirement for the document can be determined to be zero. If the document is important enough, then the pressure input requirement is determined as discussed below. Similar binary analysis can be performed for transactions as discussed with relation to FIG. 3.

At 204, the application determines engagement level that indicates an amount of engagement of the user with the document. With reference to FIG. 1, the application 104 can estimate user's engagement with content that is shown via display 108. The application 104 can determine the engagement level by determining, based on environmental data received from one or more sensors of the user device, a type of physical motion of the user device. For example, the user device can include sensors that measure location, motion, acceleration, temperature, and other environmental data. The application 104 can determine whether the user is driving, walking, sitting, jogging, etc. Based on the type of physical motion, the application 104 can estimate that, if the user is jogging and accessing the document, the amount of engagement of the user is low. Similar low engagement can be estimated if the user is driving. However, if the user is sitting down but not driving, then a higher amount of engagement can be estimated.

The application 104 can also determine the user engagement by determining a percentage of the document that is accessed by the user. The application 104 can determine an amount of time the user is spending accessing each portion of the document, and/or the entire document. The application 104 can determine this amount based on a speed of user scrolling (as detected by the user device 102) through each portion of the document. If the user device 102 includes a front-facing camera, the user device 102 can also detect user's eye movement, such as whether the user is looking at the document or simply scrolling, without visually accessing the document.

At 206, the application determines, based on the engagement level and on the context, a pressure input requirement for the document, where the pressure input requirement indicates an amount of pressure needed to verify acknowledgement of the document by the user. The application 104 can also determine the pressure input requirement to have a duration requirement for an amount of time of the user's touch input 110 at the pressure input requirement. The application 104 can determine the pressure input requirement by determining whether the user has accessed the document at the location(s of the respective tag(s).

In some embodiments, the application 104 can determine a correlation between the pressure input requirement, the engagement level, and the context of the document, and determine the pressure input requirement based on the correlation. This correlation would be similar for the discussion of FIG. 3, except that transaction importance level is used instead of the document context. The correlation can be implemented as a linear or other mathematical relationship between the pressure input requirement, the engagement level, and the context of the document. The correlation can be implemented as a table lookup, where pressure input requirements can be mapped to engagement levels and contexts of the document. The application 104 can determine the pressure input requirements by performing a table lookup of a certain engagement level and a certain context of the document.

The correlation can be implemented as an inverse relationship between the engagement level and the context of the document. For example, if the engagement level is higher and the context of the document is constant, then the pressure input requirement is lower. However, if the engagement level is lower and the context of the document is constant, then the pressure input requirement is higher. Similarly, if the engagement level is constant and the context of the document is lower, then the pressure input requirement is lower. However, if the engagement level is constant and the context of the document is higher, then the pressure input requirement is higher.

At 208, the application accesses user input. With reference to FIG. 1, the user device 102 can detect (such as via the user's touch press, e.g., via the user's touch input 110) on the display 108 if the display 108 is a touchscreen. In other implementations, the user device 102 can detect the user's press on a touchpad or a trackpad. The user device 102 can detect the location of the user's touch input 110, the amount of pressure applied at the location (e.g., at the engagement element 112), as well as duration of time that a certain pressure is applied at the location. In some embodiments, the application 104 can display a meter showing a current level of pressure and the required pressure input. The meter can also indicate the amount of time remaining during which the user touch input 110 needs to be applied at the required pressure at the engagement element 112.

As an example, upon execution of the application 104, the display 108 can display an EULA for the application for user acknowledgement. The application 104 can determine that the user has been visually accessing the EULA for 5 seconds, and has only accessed 25% of the EULA excluding portions tagged as being important. The application 104 can then determine that the user engagement level is low. Based on analysis of the EULA, the application 104 can determine that the context of the EULA indicates a high importance for the EULA. Thus, the application 104 can determine a pressure input requirement with a higher amount of pressure requirement, and optionally with a long required time duration.

At 210, the application determines whether a user touch input detected at the display matches the pressure input requirement. If the application determines that the user input does not match the pressure input requirement, flow continues back at 208. If the application determines that the user input matches the pressure input requirement, flow continues back at 212. In some embodiments, the application 104 can determine whether the amount of time remaining at which the user touch input is applied at the required pressure at the engagement element 112. At 212, the application 104 indicates that the document is acknowledged by the user. The application 104 can also indicate the document acknowledgement to the transaction server 116.

Figure 3:
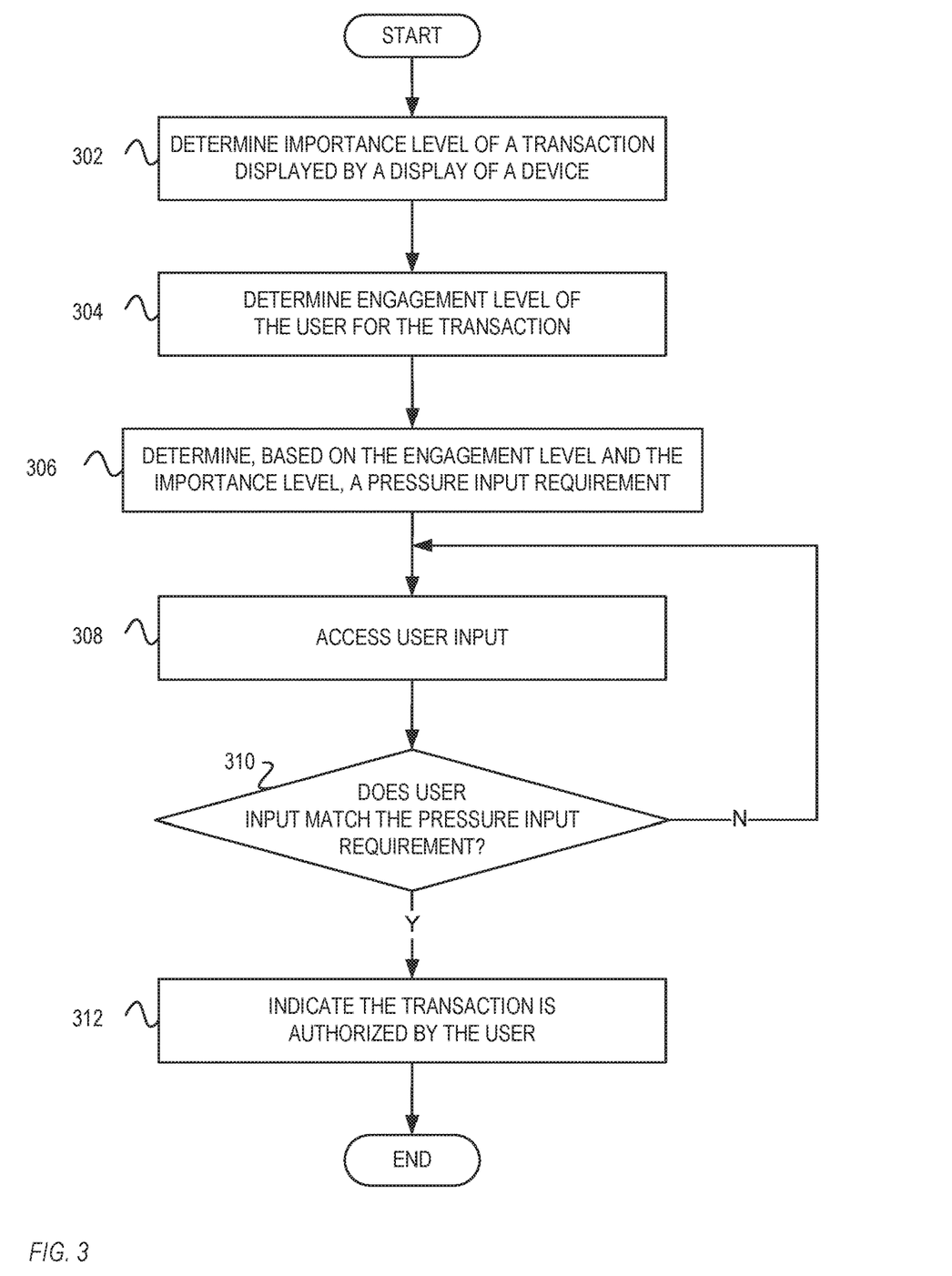
FIG. 3 is a flow diagram illustrating additional embodiments of operations for using contextual pressure-sensing input.

FIG. 3 is a flow diagram illustrating additional embodiments of operations for using contextual pressure-sensing input. The method of FIG. 2 is described with reference to the systems and components described in FIG. 1 (for illustration purposes and not as a limitation). The example operations can be carried out by the application 104. The elements of FIG. 3 are similar to the elements of FIG. 2, as noted below.

Beginning with 302, the application 104 determines importance level of a transaction that is displayed by the display 108 of the user device 102. The importance level can depend on the amount of the transaction, such as whether it is for an amount of funds greater than a certain threshold. The importance level can depend on whether the transaction is for recurring transactions (e.g., for recurring payments). The importance level can also depend on whether the transaction is being initiated at a mobile device such as a phone instead of a laptop with a touch screen. For example, transactions initiated on mobile devices can be selected for using contextual pressure-sensing input to prevent accidental transaction purchases. Transactions initiated on certain user devices (such as that of a dependent of a primary account holder) may need approval by the primary account holder. In this case, the contextual pressure-sensing input could be used as a request for transaction authorization that is sent to another user device.

At 304, the application determines engagement level that indicates an amount of engagement of the user with the transaction. The transaction engagement level can be determined based on an amount of time the user has visually accessed different portions of the transaction being displayed, including the fund amount of the transaction, the funding sources, the recipient for the transaction, and any additional documents associated with the transaction such as a return policy. The remaining elements of 302 and 304 are similar to that of 202 and 204, respectively, with noted differences of processing transactions instead of processing documents.

At 306, the application determines, based on the engagement level and on the context, a pressure input requirement for the transaction, where the pressure input requirement indicates an amount of pressure needed to verify authorization of the transaction by the user. The remaining elements of 306 and 308 are similar to that of 206 and 208, respectively.

At 310, the application determines whether a user touch input detected at the display matches the pressure input requirement. If the application determines that the user input does not match the pressure input requirement, flow continues back at 308. If the application determines that the user input matches the pressure input requirement, flow continues back at 312. At 312, the application indicates that the transaction is authorized by the user. The application 104 can also indicate the transaction authorization to the transaction server 116. The remaining elements of 310 and 312 are similar to that of 310 and 312, respectively.

As an example, upon execution of the application 104, the display 108 can display an indication of a transaction being processed. The application 104 can determine that the user has been visually accessing a fund transfer indicated by the transaction for 2 minutes, and has also changed the funding source of the transaction several times. The application 104 can then determine that the user engagement level is high. Based on analysis of the transaction, results of which can be binary, the application 104 can determine that the transaction needs to be processed for using contextual pressure-sensing input. The application 104 can then determine a pressure input requirement with a lower amount of pressure requirement, and optionally with a short required time duration.

Figure 4:
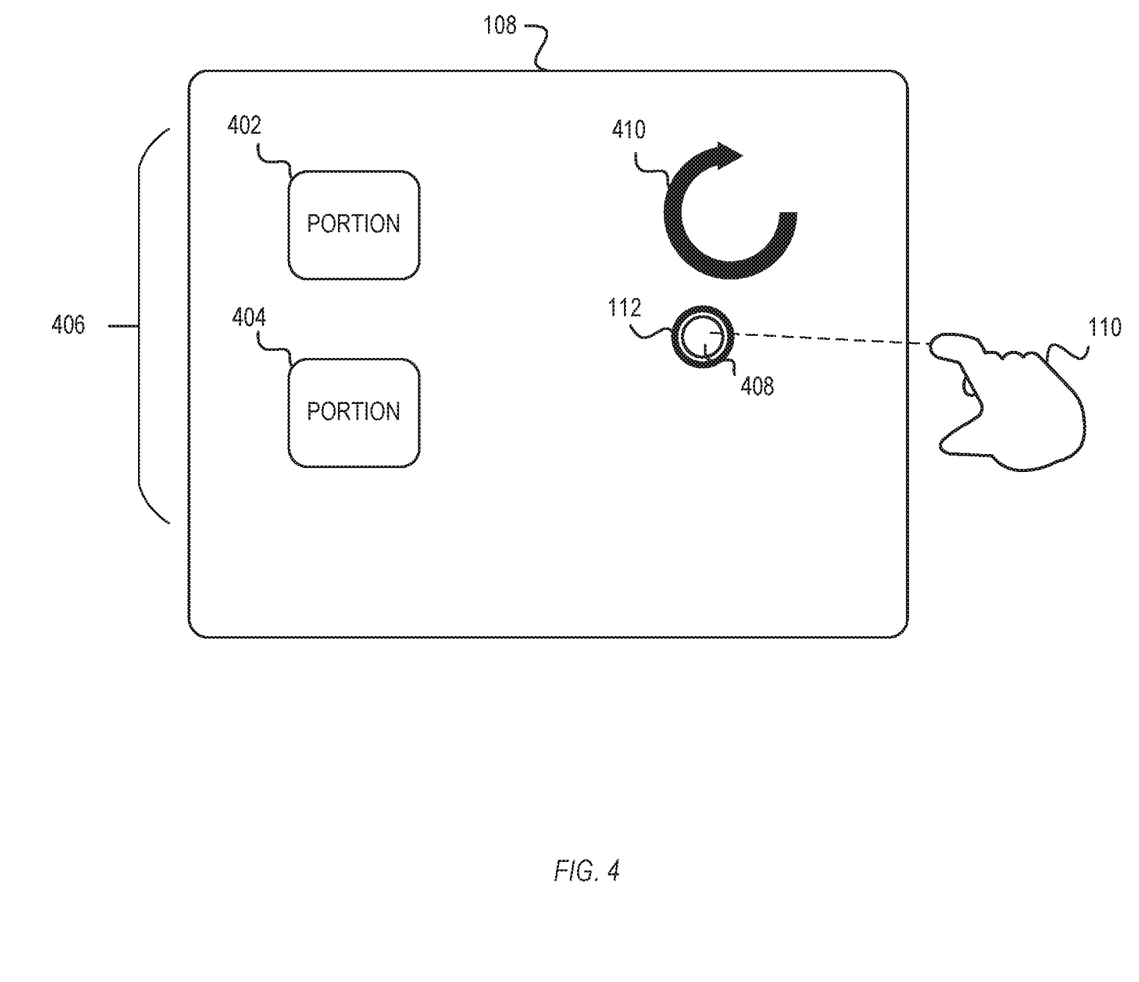
FIG. 4 is diagram illustrating one embodiment of using a display that implements contextual pressure-sensing input.

FIG. 4 is diagram illustrating one embodiment of using a display that implements contextual pressure-sensing input. FIG. 4 shows a display 108 that includes the engagement element 112 that can be selected via user's touch input 110, portions 402 and 404 of a displayed element 406, and visual meters 408 and 410.

The visual meters 408 and/or 410 can provide visual feedback to the user regarding whether the user's touch input meets the requirement(s) of the pressure input requirement. For example, the visual meters 408 and/or 410 can indicate whether the user's touch input has the required amount of pressure for the required time duration. For example, the visual meter 410 can indicate whether the duration of the user's touch input is long enough as required by the pressure input requirement. The visual meter 408 can indicate whether the pressure exerted on the display 108 (or another pressure-sensing surface) is hard enough as required by the pressure input requirement.

The displayed element 406 can be a document or indication of a transaction. If the displayed element 406 is a document, then the portions 402 and 404 can be different portions of the document. As an example, the user device 102 can determine whether the user has accessed both of the portions 402 and 404. The portions 402 can include a tag, indicating the importance of the portion 402. The user device 102 can use sensors (e.g., a camera) to determine whether the user has visually accessed the portion 402. The user device 102 can position the engagement element 112 close to the portion 402 such that the user is likely to visually access a part of the portion 402 that has an associated tag.

If the displayed element 406 is an indication of a transaction, then the portions 402 and 404 can indicate different portions of the transaction. For example, the portion 402 can indicate a cost of the transaction, and the portion 404 can indicate a funding source for the transaction. The user device 102 can position the engagement element 112 close to the portion 404 such that the user is likely to visually access and confirm the funding source for the transaction.

Figure 5:
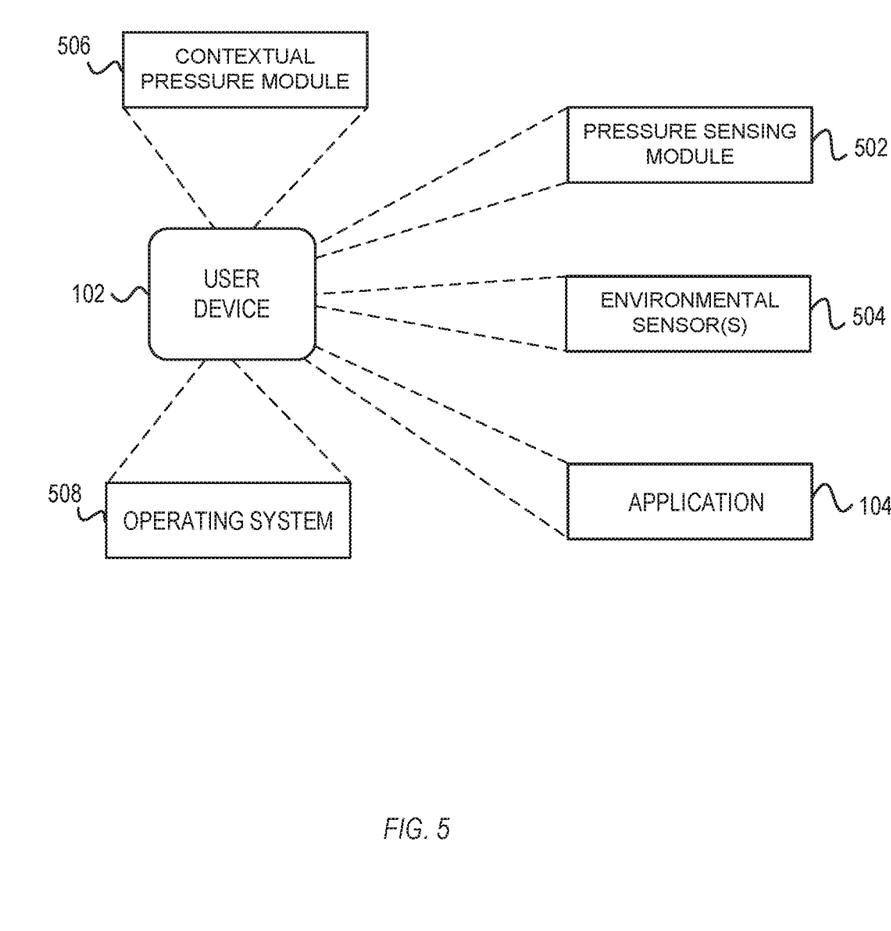
FIG. 5 is system diagram illustrating embodiments of a device that implements contextual pressure-sensing input.

FIG. 5 is system diagram illustrating embodiments of a device that implements contextual pressure-sensing input. The application 104 and an operating system 508 can execute on the user device 102. The user device 102 can include a pressure sensing module 502, one or more environmental sensors 504, and a contextual pressure module 506.

The application 104 be a payment application for facilitating payment transactions with transaction server 116. The application 104 can require that a transaction be authorized prior to submitting the transaction for processing at the transaction server 116. The application 104 may require that the user acknowledges a EULA for the application 104 prior to allowing the user to access functionality of the application 104. In some embodiments, the operating system 508 can require that the user acknowledges the EULA of the application 104 prior to allowing the user to access functionality of the application 104.

The pressure sensing module 502 can be a part of the display 108 or interface with sensors of the display 108. For example, the pressure sensing module 502 can be receive input from resistive and/or capacitive touchscreens of the display 108. The pressure sensing module 502 can measure changes in electric current of the display 108 to detect a location of the user's touch input as well as a pressure applied by the user's touch input at the location.

The environmental sensors 504 can include various sensors of the user device 102, such as accelerometers, camera(s), gyroscopes, among others. Data from the environmental sensors 504 can be used to determine a type of motion of the user. The contextual pressure module 506 can perform the determinations of the flowcharts of FIGS. 2 and 3. The contextual pressure module 506 can be implemented as part of the application 104 or as a stand-alongy application that executes on the user device 102 and communicates with the application 104. In some embodiments, the contextual pressure module 506 can be hosted by another device (e.g., such as at the transaction server 116) and communicate with the application 104 via a network.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 1-5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
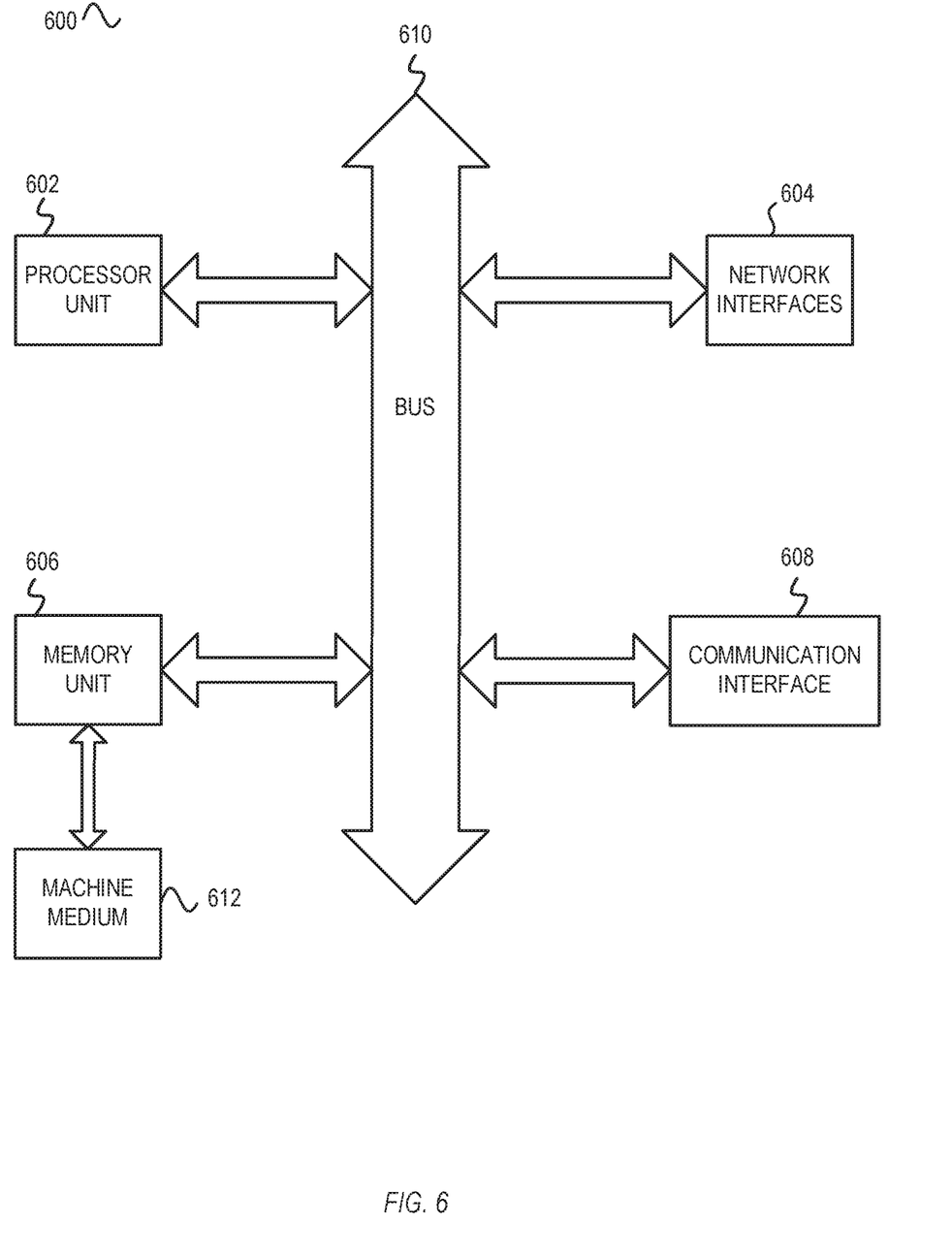
FIG. 6 is a block diagram of one embodiment of a user device discussed with reference to FIGS. 1-5.

FIG. 6 is a block diagram of an exemplary embodiment of an electronic device 600 including a communication interface 608 for network communications. The electronic device can embody functionality to implement embodiments described in FIGS. 1-5 above. In some implementations, the electronic device 600 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include the bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that implements contextual pressure-sensing input. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interface 604 and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for implementing contextual pressure-sensing input as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for using contextual pressure-sensing input, the method comprising:
   receiving, from a sender, a document to be displayed to a user by a display of a user device, the document being associated with a transaction processed by the user device through one or more user inputs to the display, the document comprising a user viewing requirement having a tagged portion for a review by the user;
   determining a threshold requirement for an output of a pressure input requirement to verify an acknowledgement of the document by the user, the threshold requirement based on a fund amount in an account used to process the transaction through the one or more user inputs;
   determining that a transaction amount of the transaction within the document exceeds the threshold requirement;
   determining a context of the document based on the transaction amount exceeding the threshold requirement and the sender;
   determining a length of display time of the document by the user device;
   determining whether the user has accessed the tagged portion for the review;
   determining an engagement level that indicates an amount of engagement of the user with the document based on the length of the display time and whether the user has accessed the tagged portion;
   determining, based on the engagement level and on the context, the pressure input requirement for the document, the pressure input requirement indicating an amount of pressure needed to verify the acknowledgement of the document by the user;
   determining an increased length of input time of the pressure input requirement for the document based on the engagement level and the tagged portion; and
   determining whether a user touch input detected at the display matches the pressure input requirement for the increased length of input time.

2. The method of claim 1, wherein said determining the engagement level comprises:
   determining, based on environmental data received from one or more sensors of the user device, a type of physical motion of the user device; and
   determining the engagement level based, at least in part, on the type of physical motion of the user device.

3. The method of claim 1, wherein determining the context of the document further comprises:
   determining an importance level of the document based on at least one of the transaction amount of the transaction and the account used to process the transaction; and
   determining the context of the document based, at least in part, on the importance level.

4. The method of claim 1,
   wherein said determining the context of the document further comprises determining a location of the tagged portion in the document; and
   wherein said determining the pressure input requirement comprises requiring the pressure input requirement to be associated with the location.

5. The method of claim 1, wherein said determining the engagement level comprises:
   determining an amount of time the user is spending accessing each portion of the document.

6. The method of claim 1, wherein said determining the engagement level comprises:
   determining a percentage of the document that is accessed by the user.

7. The method of claim 1, further comprising:
   responsive to a determination that the user touch input matches the pressure input requirement, indicating that the document is acknowledged by the user.

8. The method of claim 1, further comprising:
   determining a correlation between the engagement level and the context of the document, wherein said determining the pressure input requirement is based on the correlation.

9. The method of claim 1, further comprising:
displaying, through a visual feedback, a meter showing a current level of pressure and the pressure input requirement.

10. A system comprising:
a non-transitory memory storing instructions; and
a processor configured to execute the instructions to cause the system to:
receive, from a sender, a document to be displayed to a user by a display of a user device, the document being associated with a transaction processed by the user device through one or more user inputs to the display, the document comprising a user viewing requirement having a flagged portion for a review by the user;
determine a threshold requirement for output of a pressure input requirement to verify an acknowledgement of the document by the user, the threshold requirement based on a fund amount in an account used to process the transaction through the one or more user inputs;
determine that a transaction amount of the transaction within the document exceeds the threshold requirement;
determine a context of the document based on the transaction amount exceeding the threshold requirement and the sender;
determine a length of display time of the document by the user device;
determine whether the user has accessed the flagged portion for the review;
determine an engagement level that indicates an amount of engagement of the user with the document based on the length of the display time and whether the user has accessed the flagged portion;
determine, based on the engagement level and on the context, the pressure input requirement for the document, the pressure input requirement indicating an amount of pressure needed to verify the acknowledgement of the document by the user;
determine an increased length of input time of the pressure input requirement for the document based on the engagement level and the flagged portion; and
determine whether a user touch input detected at the display matches the pressure input requirement for the increased length of input time.

11. The system of claim 10, wherein said determining the engagement level comprises:
determining, based on environmental data received from one or more sensors of the user device, a type of physical motion of the user device; and
determining the engagement level based, at least in part, on the type of physical motion of the user device.

12. The system of claim 10, wherein executing the instructions further causes the system to:
determining a correlation between the engagement level and the context of the document, wherein said determining the pressure input requirement is based on the correlation.

13. The system of claim 10, wherein executing the instructions further causes the system to:
responsive to a determination that the user touch input matches the pressure input requirement, indicate that the document is acknowledged by the user.

14. A non-transitory machine-readable medium having instructions stored thereon, the instructions executable to cause performance of operations comprising:
receiving, from a sender, a transaction to be displayed to a user by a display of a user device, the transaction processed by the user device through one or more user inputs to the display, the transaction comprising a user viewing requirement having a flagged portion for a review by the user;
determining a threshold requirement for output of a pressure input requirement to verify an acknowledgement of the transaction by the user, the threshold requirement based on a fund amount in an account used to process the transaction through the one or more user inputs;
determining that a transaction amount of the transaction within the transaction exceeds the threshold requirement;
determining an importance level of the transaction presented to the user by the display of the user device based on the transaction amount exceeding the threshold requirement and the sender;
determining a length of display time of the transaction by the user device;
determining whether the user has accessed the flagged portion for the review;
determining an engagement level that indicates an amount of engagement of the user for the transaction based on the length of the display time and whether the user has accessed the flagged portion;
determining, based on the engagement level and on the importance level, the pressure input requirement for the transaction, the pressure input requirement indicating an amount of pressure needed to verify an authorization of the transaction by the user;
determining an increased length of input time of the pressure input requirement for the transaction based on the engagement level and the flagged portion; and
determining whether a user touch input detected by a pressure sensing input device match the pressure input requirement for the increased length of input time.

15. The non-transitory machine-readable medium of claim 14, wherein said determining the engagement level comprises:
determining, based on environmental data received from one or more sensors of the user device, a type of physical motion of the user device; and
determining the engagement level based, at least in part, on the type of physical motion of the user device.

16. The non-transitory machine-readable medium of claim 14, wherein the operations further comprise:
determining a correlation between the engagement level and the transaction, wherein said determining the pressure input requirement is based on the correlation.

17. The non-transitory machine-readable medium of claim 14, wherein the operations further comprise:
responsive to a determination that the user touch input matches the pressure input requirement, indicating that the transaction is authorized by the user.

18. The method of claim 1, further comprising:
generating an engagement element for an entry of the pressure input requirement on the display of the user device;
determining a position on the display for an output of the engagement element based on a selection element of the account within the document currently being displayed by the user device; and
displaying the engagement element on the display with a visual feedback of an amount of pressure applied for an amount of time by a user touch input.

19. The system of claim 10, wherein executing the instructions further causes the system to:
- generate an engagement element for an entry of the pressure input requirement on the display of the user device;
- determine a position on the display for an output of the engagement element based on a selection element of the account; and
- display the engagement element at the position on the display with a visual feedback of an amount of pressure applied by a user touch input.

20. The non-transitory machine-readable medium of claim 14, wherein the operations further comprise:
- generating an engagement element for an entry of the pressure input requirement on the display of the user device;
- determining a position on the display for output of the engagement element based on a selection element of the account within a portion of the transaction currently being displayed by the user device; and
- displaying the engagement element on the display with a visual feedback of an amount of pressure applied by a user touch input.

* * * * *